(12) United States Patent
Tuoriniemi et al.

(10) Patent No.: US 7,756,156 B2
(45) Date of Patent: Jul. 13, 2010

(54) METHOD FOR CANDIDATE ACCESS ROUTER CAPABILITY DISCOVERY

(75) Inventors: Aimo Tuoriniemi, Espoo (FI); Gabor Fodor, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 720 days.

(21) Appl. No.: 10/584,491

(22) PCT Filed: Dec. 23, 2003

(86) PCT No.: PCT/SE03/02087

§ 371 (c)(1),
(2), (4) Date: Apr. 10, 2007

(87) PCT Pub. No.: WO2005/062580

PCT Pub. Date: Jul. 7, 2005

(65) Prior Publication Data

US 2007/0189188 A1    Aug. 16, 2007

(51) Int. Cl.
*H04J 3/16* (2006.01)
(52) U.S. Cl. ................. 370/468; 455/442
(58) Field of Classification Search ........... 370/310, 370/328, 329, 331, 338, 464, 465, 466, 467, 370/474, 475, 476, 477; 455/3.01, 3.03, 455/3.04, 73, 403, 422.1, 436, 439, 442, 455/550.1, 552.1; 709/238, 242, 243
See application file for complete search history.

(56) References Cited

U.S. PATENT DOCUMENTS

2003/0018810 A1 * 1/2003 Karagiannis et al. ........ 709/238

(Continued)

FOREIGN PATENT DOCUMENTS

JP    2003-508940    3/2003

(Continued)

OTHER PUBLICATIONS

Paivi Kankaanpaa, "Candidate Access Router Discovery", Helsinki University of Technology, Telecommunications software and multimedia laboratory, May 28, 2003.*

(Continued)

*Primary Examiner*—Seema S Rao
*Assistant Examiner*—Khoa Huynh
(74) *Attorney, Agent, or Firm*—Nixon & Vanderhye P.C.

(57) ABSTRACT

A method of retrieving candidate access router discovery (CARD) information in a user terminal which is present in a many access systems. CARD information is exchanged on an IP control plane between access routers in the access systems, but the user terminal has no IP control plane. In accordance with the invention CARD protocol information is translated into L2 information messages which are transmitted to the user terminal either as extensions to the conventional protocol used for bearer service set up between the user terminal and an access router or as extensions to the conventional protocol used by the individual access system for broadcasting of its system characteristics. In the former case the translated CARD information is transmitted on an L2 bearer service between the current access router and the user terminal and in the latter case the translated information is broadcasted by each access router. The invention also relates to a radio access router and a terminal. (FIG. 3 for publication).

3 Claims, 2 Drawing Sheets

U.S. PATENT DOCUMENTS

| | | | |
|---|---|---|---|
| 2003/0174667 A1* | 9/2003 | Krishnamurthi et al. | 370/328 |
| 2004/0176024 A1* | 9/2004 | Hsu et al. | 455/3.04 |
| 2004/0196808 A1* | 10/2004 | Chaskar et al. | 370/331 |

FOREIGN PATENT DOCUMENTS

| | | |
|---|---|---|
| JP | 2003-209872 | 7/2003 |
| JP | 2003-224589 A | 8/2003 |
| WO | 02/080607 A1 | 10/2002 |
| WO | 03/092314 A1 | 11/2003 |

OTHER PUBLICATIONS

International Search Report of PCT/SE2003/002087, mailed Jul. 13, 2004.

English translation of a Chinese Office Action mailed Mar. 28, 2008 in corresponding Chinese application 200380110878.0.

Päivi Kankaanpää, "Candidate Access Router Discovery", Helsinki University of Technology Telecommunications software and multimedia laboratory, May 28, 2003 (10 pages).

J.M. Oyoqui et al., "Context transfer for seamless micro-mobility", Computer Science, 2003, ENC 2003, Proceedings of the Fourth Mexican International Conference on Sep. 12, 2003, pp. 291-297 (Abstract only).

J.M. Oyoqui et al., "Context transfer for seamless micro-mobility", Computer Science, 2003, ENC 2003, Proceedings of the Fourth Mexican International Conference on Sep. 12, 2003 (8 pages).

* cited by examiner

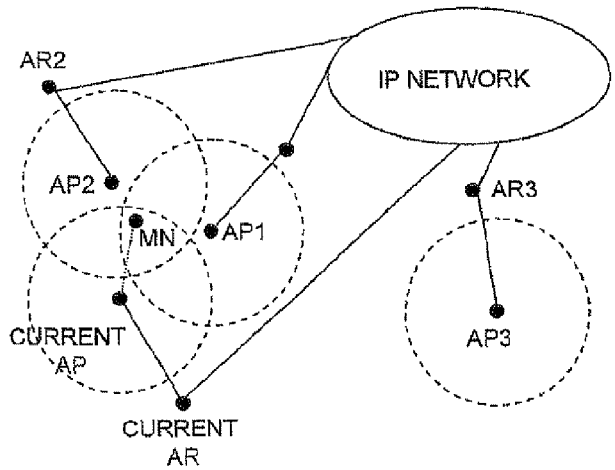
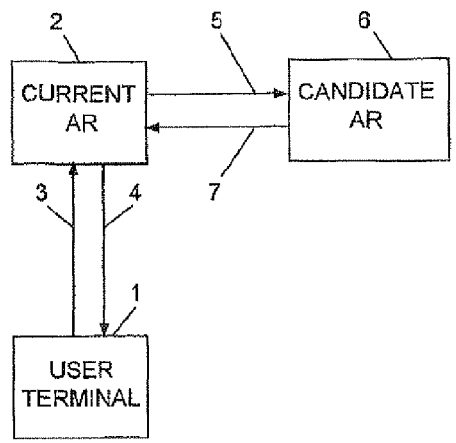
FIG. 1      FIG. 2
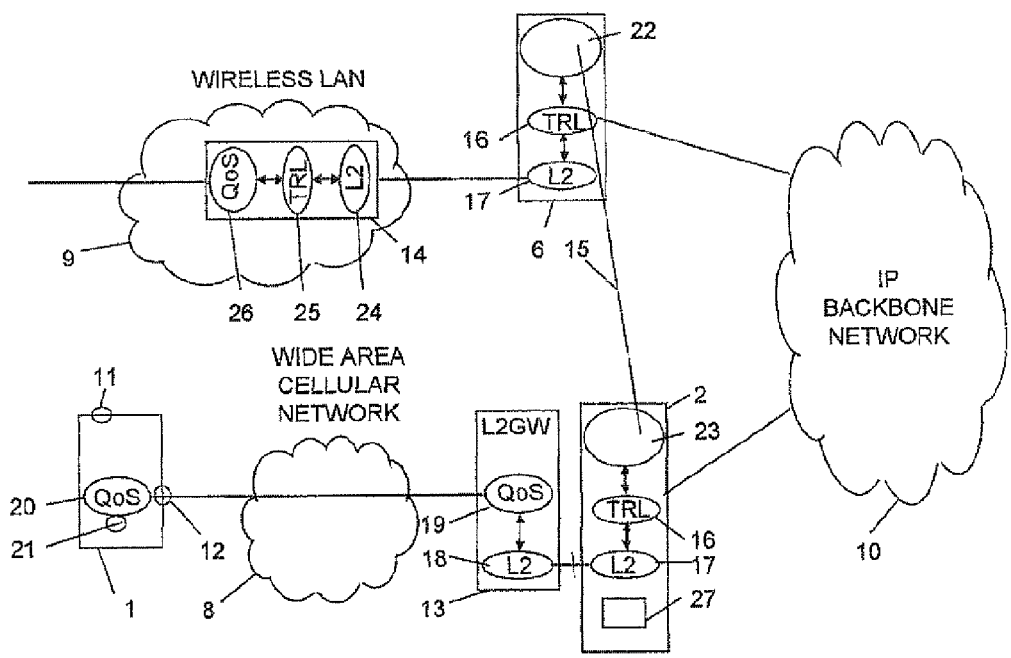
FIG. 3

METHOD FOR CANDIDATE ACCESS ROUTER CAPABILITY DISCOVERY

This application is the U.S. national phase of international application PCT/SE2003/002087, filed 23 Dec. 2003, which designated the U.S., the entire content of which is hereby incorporated by reference.

TECHNICAL FIELD OF THE INVENTION

This invention relates to a method for discovery of candidate access router capabilities, an access router, and a terminal.

DESCRIPTION OF RELATED ART

An excellent background of candidate access router discovery (CARD) is given in [1]. In order to familiarise the reader with CARD the following is an extract from this reference.

[1] Päivi Kankaanpää, "Candidate Access Router Discovery", Helsinki University of Technology, Telecommunications software and multimedia laboratory, May 28, 2003.

In wireless networks mobile nodes need every now and then to change their access router. To make this handover seamless there is a need to know in advance where to connect. Candidate access router discovery is used to find those access routers to which the mobile node could connect. All routers do not have equal capabilities and in order to be able to make a decision where the mobile node could get the service it needs, candidate access router discovery finds out candidate access routers' capabilities.

FIG. 1 illustrates the basic situation. A mobile node MN is connected to the current access router AR through the current access point AP. The coverage areas of AP1 and AP2 also cover the MN's current location. So, there are two candidate access routers (CARs) AR1 and AR2 serving the AP1 and AP2, respectively. CARD solves the IP addresses and the capabilities of the routers AR1 and AR2. The AR3 is not a CAR because the MN is not in the coverage area of AP3. The access points connect to their serving access routers. The access routers connect further to the IP network.

Mobile Node (MN) is defined as an IP host capable of moving its point of attachment to the IP network.

Access Router (AR) is defined as an IP router residing in an access network and connected to one or more APs. An AR offers IP connectivity to MN.

Access Point (AP) is defined as a radio transceiver by which an MN obtains Layer 2 (L2) connectivity with the wired network.

The mobile node MN listens to the L2 beacons to locate a new access point to which it can connect to a CAR. Reverse address translation is needed to map the AP's L2 ID to the IP address of the CAR to which the AP is connected to. Discovery of CAR capability makes it possible to choose such an AR that serves the MN's needs best. Capability information is used as input to an target access router (TAR) selection algorithm. Capabilities could be, for example, security functions, available bandwidth, access costs, and QoS services.

Some features that can be implemented with CARD are load balancing, least-cost calls and resource intensive applications. Based on the capability information the mobile node could choose the AR with least load and thus help in balancing the load between ARs, or the new router could be chosen based on access prices to get the cheapest possible service.

Resource intensive applications require high bandwidth and possibly QoS support. With CARD a suitable AR can be found.

The CARD protocol [2] is an IP layer protocol that allows signalling between the MN and the AR and also between individual ARs for obtaining CAR information. The signalling may be MN orchestrated or network assisted. In MN orchestrated mode the MN executes the CARD protocol. In network assisted mode CARD is executed in the current AR.

[2] Pat Calhoun, James Kempf "Context Transfer, Handoff Candidate Discovery, and Dormant Mode Host Alerting (seamoby)", Oct. 16, 2003 http://www.ietf.org/html.charters/seamoby-charter.html The CARD protocol is initiated when the MN discovers a new AP while listening on L2 beacons. The format of the messages depends on the interface over which the messages are sent. An MN-AR interface uses ICMP messages (Internet Control Message Protocol) or is piggybacked on other ICMP messages. Interfaces AR-AR and AR-CARD server use UDP (User Datagram Protocol) as transport mechanism.

This ends the recitation of reference [1].

The messages exchanged are shown in FIG. 2. A user terminal 1 requests CARD information from a current access router 2 by a CARD Request message 3. The current access router replies back with a CARD reply 4 message. If the requested information is not in a CAR table established in the current access router this access router has to request the information from a candidate access router before sending it to the user terminal. The current access router therefore sends an AR-AR CARD request 5 to a candidate access router 6, which replies with an AR-AR CARD reply 7. By this method the user terminal gets the candidate access router information (IP address and access router capabilities) that is one input to the access selection process. The contents (sub-options) of the CARD messages are:

CARD Request: L2 ID, Preferences, Requirements
CARD Reply: L2 ID, Capability container, IP address A large portion of today's mobile user terminals have no IP control plane and cannot therefore make use of the CARD information in order to select a new access point or new access router or in order to shift attachment from one access network to another. Also, many of today's access networks are lacking an IP control plane; among these are UMTS, CDMA 2000 and GSM based networks like GPRS and EDGE. This invention relates at least in part to terminals of this kind and especially to dual stack user terminals which have an UTRAN interface and a WLAN interface. The invention also relates to access routers that support the CARD protocol and that are connected to such networks lacking IP control plane.

Another drawback with today's dual stack user terminals is that they have to listen through all of its interfaces towards the various access networks, in order to receive L2 beacons from the respective access networks, such beacons being used for the purpose of making the user terminal aware of the existence of other access networks. Listening trough all interfaces drains the terminal's battery.

SUMMARY OF THE INVENTION

An embodiment of the present invention removes or to a large extent reduces the drawbacks with today's user terminals and allows a user terminal that has no IP control plane to retrieve candidate access router discovery information (CARD information) that are signalled on an IP control plane between access routers of wireless networks. The retrieved CARD information is used for selection of the candidate access router whose functionalities best fulfill the requirements the user terminal has.

Another embodiment allows signalling of translated CARD information to existing and future terminals lacking IP control plane, and allows signalling to existing and future access networks which are lacking IP control plane but to which access routers in accordance with an embodiment are connected.

In an example method, CARD protocol information on L3 is translated into L2 information messages which are transmitted to the user terminal either as extensions to the conventional protocol used for bearer service set up between the user terminal and an access router or as extensions to the conventional protocol used by the individual access system for broadcasting of its system characteristics. In the former case the translated CARD information is transmitted on an L2 bearer service between the current access router and the user terminal and in the latter case the translated information is broadcasted by each access router on the L2 level.

An advantage achieved is that only slight modifications need to be made in the protocol information as conventionally beaconed on L2 from the access routers.

An advantage achieved is that CARD information originating from access routers in candidate access networks are received by the user terminal over one and the same interface, i.e. the interface to the current access router.

An advantage is that battery drain is greatly reduced in that the user terminal listens in all its interfaces only for a short period in order to determine the access that best suits the user terminal's needs. Following this access to the best access router is established and the user terminal deactivates all its access network interfaces except the one to which access has been established.

BRIEF DESCRIPTION OF THE DRAWINGS

FIG. 1 is a schematic view illustrating the CARD concept,
FIG. 2 is a schematic view illustrating the CARD message exchange between the current AR and a candidate AR as well as between the user terminal and the current AR
FIG. 3 is a network view of a first embodiment of the invention.

DETAILED DESCRIPTION OF EMBODIMENTS

Figure 4:
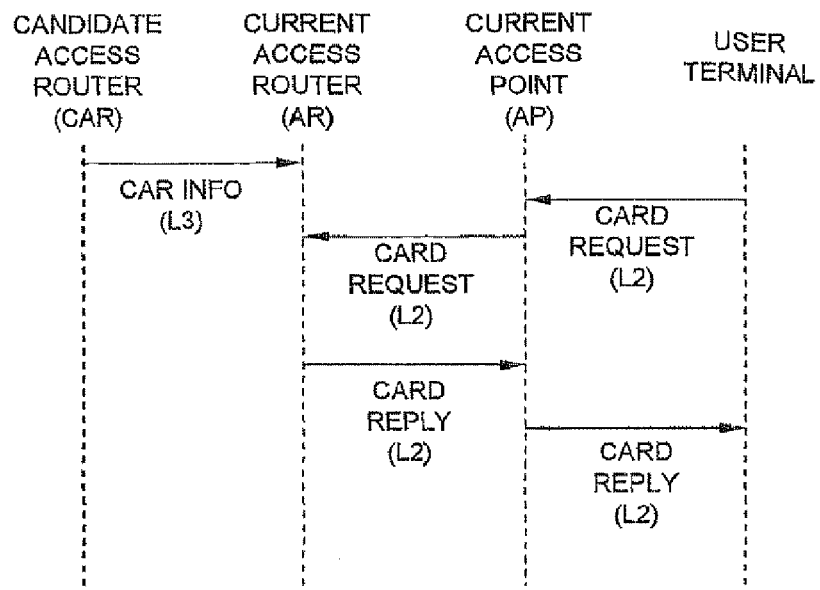
FIG. 4 is a call flow sequence.

In FIG. 3 the user terminal 1 is shown to reside in the coverage area of a wide area cellular network 8 and a wireless local area network 9 (WLAN), both of which are connected to an IP backbone network 10. The candidate access router 6 connects the WLAN to the IP backbone network and current access router 2 connects the cellular network 8 to the IP backbone network.

The user terminal is a double stack terminal with two interfaces 11, 12 over which it can communicate with the WLAN and the wide area cellular network respectively. The terminal is connected to the current access router via a layer 2 gateway (L2 GW) 13.

The access router 6 of the WLAN has many access points 14 of which only one is shown for clarity reasons.

Using the CARD protocol the current access router has exchanged CARD information with its neighbouring access routers. The CARD information received by the current access router is stored in a non-shown CARD list. This CARD protocol signalling is schematically shown at line 15.

In accordance with a first embodiment of the invention the CARD information the current access router has gathered from its neighbour access routers is translated into corresponding L2 information which then is signalled to the user terminal in messages that are extensions to the conventional protocol which is set up by the bearer service between the user terminal and the current access router. Messages that are extension must of course be understood by the user terminal. Once the translated CARD information has been received by the user terminal it is used for access selection by a non-shown TAR selection algorithm.

To implement the above the current access router comprises a translator 16 that translates from IP based CARD information into L2 based information which is forwarded to an L2 entity 17 which in its turn transmits the information to the L2 GW. The L2 GW provides L2 functionality for signalling and bearer service set up and comprises an L2 entity 18 that receives the conventional signalling messages used by the bearer service set up protocol plus the translated CARD information and forwards it to a quality of service (QoS) manager 19 that in a conventional manner sets up the bearer service to the user terminal. In accordance with the embodiment the QoS manager also fetches the translated CARD information from the L2 entity and forwards it to over the wide area cellular network to the user terminal provided with a QoS manager 20. QoS manager 20 further to understanding the conventional protocol messages also is provided with means 21 for understanding the protocol extensions that relate to translated CARD information.

The CARD processes or states in the access routers 6, 2 are shown at 22 and 23.

As an example the wide area cellular network is UMTS. The L2 GW and current access router are co-localized in a GGSN node (Gateway GPRS Support Node). L2GW provides UMTS signalling and UMTS bearer service. The L2 entities 17, 18 may be interconnected using for example an optical fibre and an open interface schematically shown by a dash. The UMTS protocol used by QoS managers 19, 20 has extensions that relate to CARD functions, namely reverse address translation and discovery of CAR capability.

In an evolved WCDMA network the L2GW network node 13 and the access router 2 are co-located and together form a radio network controller RNC.

In a future implementation the L2GW and current access router may be physically as well as logically separated as shown in FIG. 3.

In this embodiment of the invention the user terminal is listening only in its wide area cellular network interface 12 and will receive therein, further to conventional protocol messages on the L2 layer, CARD information on all candidate access routers with which its current access router 2 is able to communicate with the aid of the CARD protocol. In particular the user terminal does not need to activate its WLAN interface 11 in order to obtain information on the presence and capabilities of the WLAN access router 6. Such information as well as information from all other candidate access systems is namely received in the interface 12. Accordingly battery drain of the user terminal will be reduced. Over the air signalling will be reduced if the access routers in the networks are configured not to broadcast advertisements on their capabilities.

Since it is required that every access router can transmit translated CARD information they and their associated access points 14 must be provided with an L2 entity 24, a translator 25 and a QoS manager 26.

In order to reduce over the air signalling the translated card information is forwarded to the user terminal only when there is a candidate access router that offers capabilities that suits the needs of the user terminal better than the current access router's do. To achieve this the acess router is provided with means 27 for evaluating the CARD functionalities offered by candidate access routers with the CARD functionalities offered by the access router to which the terminal currently is connected and for initiating transmission of layer 2 translated CARD information only in case said evaluation reveals that there is a candidate access router with better CARD functionalities than those of the current access router, in which case said means is adapted to send the corresponding CARD information.

An operator of the current access router may filter the CARD information sent to the user terminal and may for example only forward CARD information associated with access routers in networks that are driven to the operator or by partners with whom the operator co-operates.

In FIG. 4 an example of a call flow sequence in the first embodiment of the invention is shown.

Figure 5:
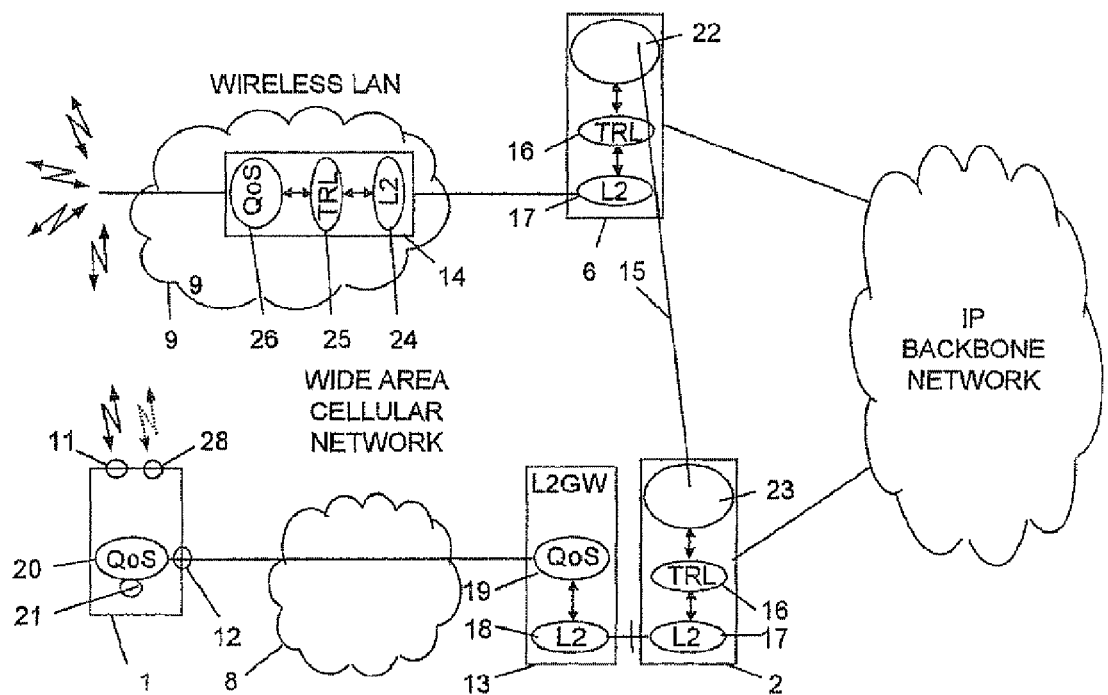
FIG. 5 is a network view of a second embodiment of the invention.

In FIG. 5 a second embodiment of the invention is shown. This embodiment makes use of the broadcast capabilities of most access technologies (wireless and Ethernet in particular). Like the first embodiment the second embodiment requires no IP control plane in the user terminal. In particular the CARD Reply message containing the above discussed CARD protocol extensions with the CARD information inserted therein is translated into L2 information and is broadcasted in addition to the conventionally broadcasted system information. The information inserted into the extended protocol is broadcasted at the access points of the candidate access systems.

It will be noted that no IP control plane signalling is used for transferring the translated CARD information to the user terminal. The user terminal receives this information in broadcast transmissions from the candidate access systems while the user terminal is connected to the current access router. The user terminal should therefore listen in all its interfaces in order to monitor the broadcasted transmissions from candidate access systems.

Broadcasted information is symbolically shown with double headed flashes of lightning. The flash of lightning shown with a dotted line originates from a non-shown third access system, for example a fourth generation (4G) access system and is received by the user terminal through an additional interface 28.

A main advantage with the second embodiment is that the user terminal receives CARD information from all candidate access systems and uses this information as input to its target access router selection algorithm. Therefore the access system that best corresponds to the needs of the user terminal will be selected as access system. The following connection of the user terminal to the access system will therefore be an access to the best access system. In other words, the following scenario is avoided: (1) At first the terminal connects to an access router of a first access system, thereafter (2) this access router transmits its CARD information to the terminal, then (3) the terminal's access selection algorithm compares the received CARD information with the capabilities of the first access system and finds there is a second access system that best corresponds to the needs of the user terminal, and finally (4) the terminal connects to an access router of the second access system.

Once the terminal has connected to the selected access system it will continue to listen in all its interfaces and input the received translated CARD information to its access selection algorithm, which at a regular basis performs access selection.

An advantageous third embodiment of the invention is the combination of the first and second embodiments. Initially the user terminal listens for broadcasted CARD information in all its interfaces, selects the best candidate access router and connects to the corresponding access system. This is a swift and short procedure during which battery drain is high. This terminates the second embodiment/mode of operation. Thereafter the user terminal deactivates all its interfaces except the one to the selected access network and initiates the first embodiment/mode of operation in accordance with which the user terminal listens for candidate access routers via its connection to the current access router using the extended UMTS or corresponding protocol. In this mode the battery drain is low. The third embodiment ensures instant access to the best access router.

The invention claimed is:

1. In a multi access system comprising plural access routers, a method of selecting a target access router among said plural access routers, said method comprising:
    a user terminal activating plural layer 2 communication interfaces;
    said user terminal listening to broadcasts of router capability information of said plural access routers over said plural layer 2 communication interfaces, wherein said router capability information are broadcasted without using IP control plane;
    said user terminal selecting a current access router for access to said multi access system among said plural access routers based on said router capability information received over said plural layer 2 communication interfaces using a target access router selection algorithm;
    said user terminal connecting with said current access router using a layer 2 communication service and receiving said router capability information of said plural access routers transmitted from said current access router over said layer 2 communication service, wherein said layer 2 communication service between said current access router and said user terminal takes place without using IP control plane;
    and said user terminal selecting said target access router for access to said multi access system among said plural access routers based on said router capability information received from said current access router using said target access router selection algorithm, wherein said current access router is included in said plural access routers.

2. A method in accordance with claim 1, further comprising said user terminal sending a request to said current access router for said router capability information over said layer 2 prior to said step of said user terminal receiving said layer 2 based router capability information transmitted from said current access router over said layer 2 communication service.

3. A method in accordance with claim 1, further comprising said user terminal deactivating all layer 2 communication interfaces except the interface used in communication with said current access router after said step of said user terminal selecting said current access router.

* * * * *

UNITED STATES PATENT AND TRADEMARK OFFICE
CERTIFICATE OF CORRECTION

PATENT NO. : 7,756,156 B2
APPLICATION NO. : 10/584491
DATED : July 13, 2010
INVENTOR(S) : Tuoriniemi et al.

Page 1 of 1

It is certified that error appears in the above-identified patent and that said Letters Patent is hereby corrected as shown below:

In Column 3, Line 36, delete "AR" and insert -- AR, --, therefor.

In Column 4, Line 66, delete "acess" and insert -- access --, therefor.

Signed and Sealed this
Twenty-fifth Day of January, 2011

David J. Kappos
*Director of the United States Patent and Trademark Office*